United States Patent
Evans et al.

(10) Patent No.: US 8,762,476 B1
(45) Date of Patent: Jun. 24, 2014

(54) RDMA TO STREAMING PROTOCOL DRIVER

(75) Inventors: Gregory M. Evans, Raleigh, NC (US); Thomas A. Roberts, Fuquay-Varina, NC (US); James Evans, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1026 days.

(21) Appl. No.: 11/961,632

(22) Filed: Dec. 20, 2007

(51) Int. Cl.
*G06F 15/167* (2006.01)

(52) U.S. Cl.
USPC ............. 709/212; 725/86; 725/105; 725/118; 709/217

(58) Field of Classification Search
None
See application file for complete search history.

(56) References Cited

U.S. PATENT DOCUMENTS

| | | | |
|---|---|---|---|
| 5,155,591 A | 10/1992 | Wachob | |
| 5,231,494 A | 7/1993 | Wachob | |
| 5,959,623 A | 9/1999 | van Hoff et al. | |
| 5,974,398 A | 10/1999 | Hanson et al. | |
| 6,128,651 A | 10/2000 | Cezar et al. | |
| 6,161,127 A | 12/2000 | Cezar et al. | |
| 6,574,793 B1 | 6/2003 | Ngo et al. | |
| 6,584,492 B1 | 6/2003 | Cezar et al. | |
| 6,697,878 B1 * | 2/2004 | Imai | 709/201 |
| 6,698,020 B1 | 2/2004 | Zigmond et al. | |
| 6,718,551 B1 | 4/2004 | Swix et al. | |
| 6,738,978 B1 | 5/2004 | Hendricks et al. | |
| 6,799,326 B2 | 9/2004 | Boylan, III et al. | |
| 6,820,277 B1 | 11/2004 | Eldering et al. | |
| 6,938,268 B1 | 8/2005 | Hodge | |
| 7,039,932 B2 | 5/2006 | Eldering | |
| 7,076,530 B2 | 7/2006 | Betz | |
| 7,100,183 B2 | 8/2006 | Kunkel et al. | |
| 7,134,132 B1 | 11/2006 | Ngo et al. | |
| 7,146,627 B1 | 12/2006 | Ismail et al. | |
| 7,184,433 B1 * | 2/2007 | Oz | 370/389 |
| 7,185,353 B2 | 2/2007 | Schlack | |
| 7,228,555 B2 | 6/2007 | Schlack | |
| 7,245,614 B1 | 7/2007 | Podar et al. | |
| 7,281,030 B1 * | 10/2007 | Davis | 709/212 |
| 7,328,450 B2 | 2/2008 | Macrae et al. | |

(Continued)

FOREIGN PATENT DOCUMENTS

| | | |
|---|---|---|
| EP | 0 989 722 A1 | 3/2000 |
| EP | 1 067 792 A2 | 1/2001 |

(Continued)

OTHER PUBLICATIONS

Advertisement Bidding System and Method, http://www.priorartdatabase.com/IPCOM/000138556.

(Continued)

*Primary Examiner* — Patrice Winder
*Assistant Examiner* — Nam Tran
(74) *Attorney, Agent, or Firm* — Withrow & Terranova, PLLC

(57) ABSTRACT

A direct memory-to-memory to streaming protocol driver for a media content playback system is provided. In one embodiment, the direct memory-to-memory to streaming protocol driver is a Remote Direct Memory Access (RDMA). In general, the RDMA to streaming protocol driver utilizes an RDMA-enabled network interface to obtain media content from a remote content distribution server. In order to emulate a streaming protocol layer of a network stack such as, for example, the User Datagram Protocol (UDP), the RDMA to streaming protocol driver encapsulates the media content according to the streaming protocol to provide streaming media content. The streaming media content is then provided to an associated streaming protocol-based playback function.

18 Claims, 8 Drawing Sheets

(56) References Cited

U.S. PATENT DOCUMENTS

| | | | |
|---|---|---|---|
| 7,363,643 | B2 | 4/2008 | Drake et al. |
| 7,451,467 | B2 | 11/2008 | Carver et al. |
| 7,565,450 | B2 | 7/2009 | Garcia-Luna-Aceves et al. |
| 7,571,440 | B2 | 8/2009 | Vessey et al. |
| 7,600,037 | B2 | 10/2009 | Tucker |
| 7,650,617 | B2 | 1/2010 | Hoshino et al. |
| 7,652,594 | B2 | 1/2010 | Lamont et al. |
| 7,743,112 | B2 | 6/2010 | Kenna, III et al. |
| 7,783,773 | B2 | 8/2010 | Wu et al. |
| 7,882,531 | B2 | 2/2011 | Yamagishi |
| 7,996,482 | B1 | 8/2011 | Evans et al. |
| 2001/0034763 | A1 | 10/2001 | Jacobs et al. |
| 2002/0007413 | A1 | 1/2002 | Garcia-Luna-Aceves et al. |
| 2002/0019769 | A1 | 2/2002 | Barritz et al. |
| 2002/0078444 | A1 | 6/2002 | Krewin et al. |
| 2002/0087402 | A1 | 7/2002 | Zustak et al. |
| 2002/0087978 | A1 | 7/2002 | Nicholson et al. |
| 2002/0095454 | A1 | 7/2002 | Reed et al. |
| 2002/0124249 | A1 | 9/2002 | Shintani et al. |
| 2002/0124251 | A1 | 9/2002 | Hunter et al. |
| 2002/0138291 | A1 | 9/2002 | Vaidyanathan et al. |
| 2002/0138440 | A1 | 9/2002 | Vaidyanathan et al. |
| 2002/0138831 | A1 | 9/2002 | Wachtfogel et al. |
| 2002/0144263 | A1 | 10/2002 | Eldering et al. |
| 2002/0161838 | A1 | 10/2002 | Pickover et al. |
| 2002/0184403 | A1 | 12/2002 | Dahlin et al. |
| 2003/0004793 | A1 | 1/2003 | Feuer et al. |
| 2003/0009432 | A1 | 1/2003 | Sugahara et al. |
| 2003/0028888 | A1 | 2/2003 | Hunter et al. |
| 2003/0036974 | A1 | 2/2003 | Allen |
| 2003/0061607 | A1 | 3/2003 | Hunter et al. |
| 2003/0065804 | A1 | 4/2003 | Owerfeldt et al. |
| 2003/0149975 | A1 | 8/2003 | Eldering et al. |
| 2003/0165196 | A1 | 9/2003 | Demas et al. |
| 2004/0032881 | A1 | 2/2004 | Arai |
| 2004/0049600 | A1 | 3/2004 | Boyd et al. |
| 2004/0111742 | A1 | 6/2004 | Hendricks et al. |
| 2004/0163101 | A1 | 8/2004 | Swix et al. |
| 2004/0225719 | A1 | 11/2004 | Kisley et al. |
| 2004/0267880 | A1 | 12/2004 | Patiejunas |
| 2005/0036555 | A1* | 2/2005 | Ramakrishnan ......... 375/240.25 |
| 2005/0039205 | A1 | 2/2005 | Riedl |
| 2005/0091160 | A1 | 4/2005 | Kitze et al. |
| 2005/0097183 | A1 | 5/2005 | Westrelin |
| 2005/0108776 | A1 | 5/2005 | Carver et al. |
| 2005/0160470 | A1 | 7/2005 | Strauss |
| 2005/0232304 | A1 | 10/2005 | Quigley |
| 2005/0251820 | A1 | 11/2005 | Stefanik et al. |
| 2005/0259947 | A1 | 11/2005 | Wang et al. |
| 2006/0036490 | A1 | 2/2006 | Sagalyn |
| 2006/0059042 | A1 | 3/2006 | Zohar |
| 2006/0059048 | A1 | 3/2006 | Frentzel-Beyme et al. |
| 2006/0075057 | A1 | 4/2006 | Gildea et al. |
| 2006/0095507 | A1 | 5/2006 | Watson |
| 2006/0107302 | A1 | 5/2006 | Zdepski |
| 2006/0168616 | A1 | 7/2006 | Candelore |
| 2006/0212900 | A1 | 9/2006 | Ismail et al. |
| 2006/0224761 | A1 | 10/2006 | Howarth et al. |
| 2006/0230119 | A1 | 10/2006 | Hausauer et al. |
| 2006/0262799 | A1 | 11/2006 | Biran et al. |
| 2006/0294555 | A1 | 12/2006 | Xie |
| 2007/0011702 | A1 | 1/2007 | Vaysman |
| 2007/0027755 | A1 | 2/2007 | Lee |
| 2007/0028261 | A1 | 2/2007 | Bouilloux-Lafont |
| 2007/0058670 | A1 | 3/2007 | Konduru et al. |
| 2007/0065122 | A1 | 3/2007 | Chatterton |
| 2007/0112971 | A1* | 5/2007 | Noff et al. ..................... 709/231 |
| 2007/0265974 | A1 | 11/2007 | Chang |
| 2008/0127245 | A1 | 5/2008 | Olds |
| 2008/0189412 | A1 | 8/2008 | Wang et al. |
| 2008/0288556 | A1 | 11/2008 | O'Krafka et al. |
| 2008/0301311 | A1 | 12/2008 | Bestler |

FOREIGN PATENT DOCUMENTS

| | | | |
|---|---|---|---|
| EP | 1 162 840 | A2 | 12/2001 |
| EP | 1 418 514 | A1 | 5/2004 |
| EP | 1 524 602 | A2 | 4/2005 |
| EP | 1 528 478 | A1 | 5/2005 |
| WO | WO 99/05584 | A2 | 2/1999 |
| WO | WO 99/52285 | A1 | 10/1999 |
| WO | WO 00/14951 | A1 | 3/2000 |
| WO | WO 01/47153 | A2 | 6/2001 |
| WO | WO 01/71524 | A1 | 9/2001 |
| WO | WO 02/19581 | A1 | 3/2002 |
| WO | WO 02/45430 | A2 | 6/2002 |
| WO | WO 02/054754 | A2 | 7/2002 |
| WO | WO 03/053056 | A1 | 6/2003 |
| WO | 2004080073 | A2 | 9/2004 |

OTHER PUBLICATIONS

S. Bailey et al., "The Architecture of Direct Data Placement (DDP) and Remote Direct Memory Access (RDMA) on Internet Protocols", Internet informational RFC 4296, Dec. 2005, http://www.ietf.org/rfc/rfc4296.txt.

CableLabs, PacketCable TM 2.0, "Codec and Media Specification, PKT_AP_CODEC_MEDIA_I02-061013", Oct. 13, 2006, http://www.packetcable.com/downloads/specs/PKT-SP-CODEC-MED1A-I02-061013.pdf.

H. Schulzrinne et al., "Real Time Streaming Protocol (RTSP)", Internet informational RFC 2326, Apr. 1998, http://www.ietf.org/rfc/rfc2326.txt.

H. Schulzrinne et al., "RTP: A Transport Protocol for Real-Time Applications", Internet informational RFC 3550, Jul. 2003, http://www.ietf.org/rfc/rfc3550.txt.

Hemel Shah et al., "Direct Data Placement over Reliable Transports (Version 1.0)", Oct. 2002, http://www.rdmaconsortium.org/home/draft-shah-iwarp-ddp-v1.0.pdf.

SnapStream:PC DVR and TV tuner software, http://www.snapstream.com.

Squid Cache, http://en.wikipedia.org/wiki/Squid_cache.

S. Wenger et al., "RTP Payload Format for H.264 Video", Internet informational RFC 3984, Feb. 2005, http://www.ietf.org/rfc/rfc3984.txt.

B. Cain et al., "Internet Group Management Protocol, Version 3", Internet informational RFC 3376, Oct. 2002, http://www.ietf.org/rfc/rfc3376.txt.

"Internet Protocol: DARPA Internet Program Protocol Specification", Internet informational RFC 791, Sep. 1981, http://www.ietf.org/rfc/rfc791.txt.

S. Deering et al., "Internet Protocol, Version 6 (IPv6) Specification", Internet informational RFC 2460, Dec. 1998, http://www.ietf.org/rfc/rfc2460.txt.

James Gwertzman et al., "An Analysis of Geographical Push-Caching," in Proceedings of the 5th IEEE Workshop on Hot Topics in Operating Systems, pp. 51-55, Orcas Island, WA, May 1995.

Jeff Hilland et al., "RDMA Protocol Verbs Specification (Version 1.0)", Apr. 2003, http://www.rdmaconsortium.org/home/draft-hilland-iwarp-verbs-v1.0-RDMAC.pdf.

Internet Cache Protocol, http://en.wikipedia.org/wiki/Internet_Cache_Protocol.

ITU Publications: Welcome, http://www.itu.int/publications/.

J. Postel, "User Datagram Protocol", Internet informational RFC 768, Aug. 28, 1980, http://www.ietf.org/rfc/rfc768.txt.

R. Recio et al., "A Remote Direct Memory Access Protocol Specification," Internet Draft, http://www.ietf.org/internet-drafts/draft-ietf-rddp-rdmap-07.txt, Sep. 8, 2006.

R. Recio et al., "An RDMA Protocol Specification (Version 1.0)", Oct. 2002, http://www.rdmaconsortium.org/home/draft-recio-iwarp-rdmap-v1.0.pdf.

A. Romanow et al., "Remote Direct Memory Access (RDMA) over IP Problem Statement", Internet informational RFC 4297, Dec. 2005, http://www.ietf.org/rfc/rfc4297.txt.

International Search Report for PCT/US08/66010 mailed Aug. 20, 2008, 11 pages.

(56) References Cited

OTHER PUBLICATIONS

International Search Report for PCT/US08/66245 mailed Sep. 4, 2008, 11 pages.

Examination Report for European Patent Application No. 08770254.4, mailed Feb. 5, 2014, 6 pages.
Examination Report for European Patent Application No. 08770442.5, mailed Feb. 5, 2014, 7 pages.

* cited by examiner

RDMA TO STREAMING PROTOCOL DRIVER

FIELD OF THE INVENTION

The present invention relates to a media content delivery and playback system.

BACKGROUND OF THE INVENTION

Commonly owned and assigned U.S. patent application Ser. No. 11/831,228 entitled RDMA BASED REAL-TIME VIDEO CLIENT PLAYBACK ARCHITECTURE, which was filed on Jul. 31, 2007 and is hereby incorporated herein by reference in its entirety, discloses an architecture for a client playback device that utilizes Remote Direct Memory Access (RDMA) or some other similar direct memory-to-memory transfer scheme to transfer media content and/or targeted advertisements from a remote server to the client playback device. One issue is that a playback function of the client playback device may be a standard streaming protocol playback function such as, for example, a User Datagram Protocol (UDP)-based or Real-time Transport Protocol (RTP)-based streaming playback function. In other words, the playback function may be capable of performing playback of media content in a streaming format rather than an RDMA format. Thus, there is a need for a system and method that enable playback of media content obtained utilizing RDMA or similar direct memory-to-memory transfers by a streaming playback function.

SUMMARY OF THE INVENTION

The present invention provides a direct memory-to-memory to streaming protocol driver for a media content playback system. In one embodiment, the direct memory-to-memory to streaming protocol driver is a Remote Direct Memory Access (RDMA) to streaming protocol driver. In general, the RDMA to streaming protocol driver utilizes an RDMA-enabled network interface to obtain media content from a remote content distribution server. In order to emulate a streaming protocol layer of a network stack such as, for example, the User Datagram Protocol (UDP), the RDMA to streaming protocol driver encapsulates the media content according to the streaming protocol to provide streaming media content. The streaming media content is then provided to an associated streaming protocol-based playback function.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
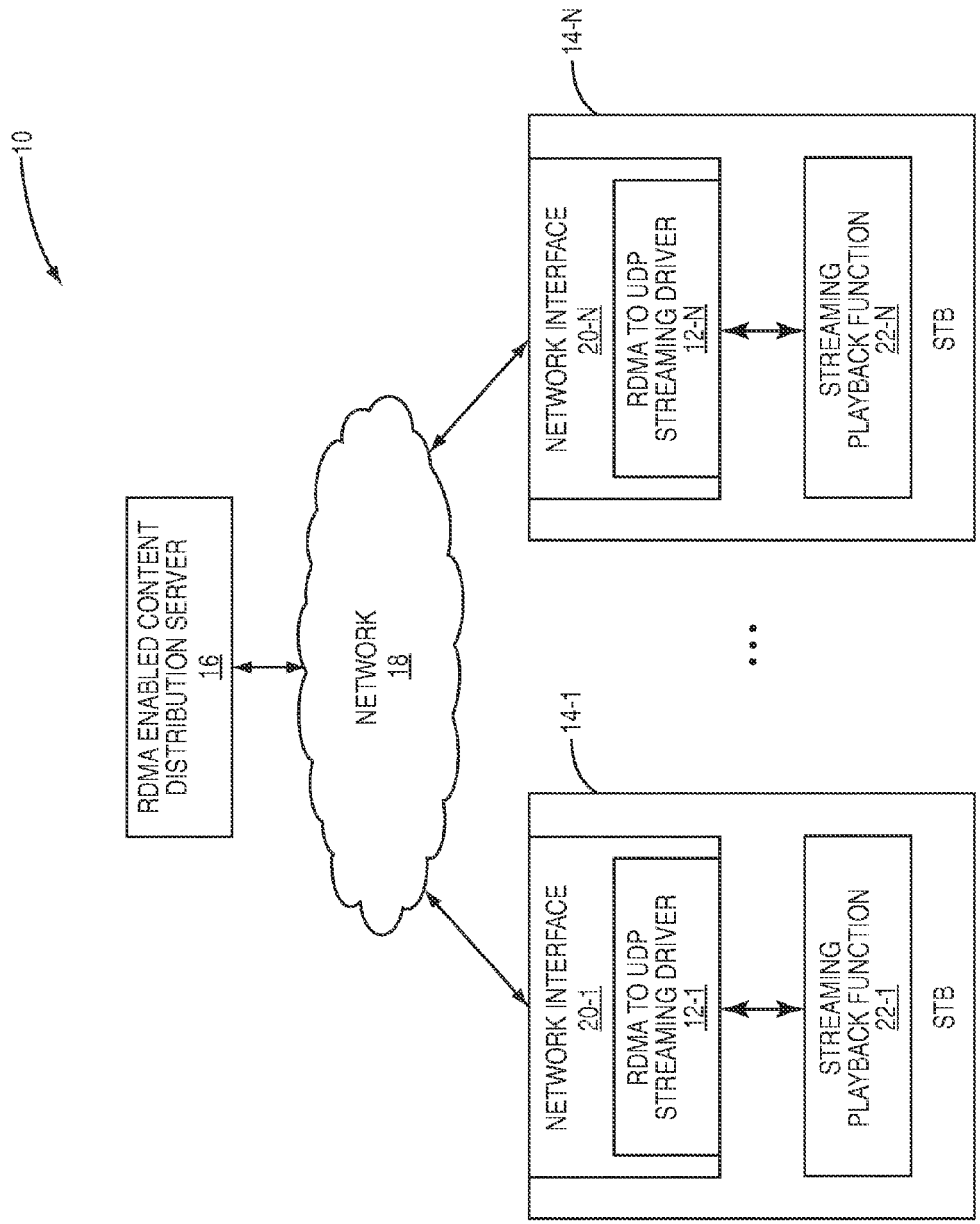
FIG. 1 illustrates a system incorporating a Remote Direct Memory Access (RDMA) to streaming protocol driver into a set-top box (STB) according to a first embodiment of the present invention.

FIG. 1 illustrates a system 10 incorporating Remote Direct Memory Access (RDMA) to streaming protocol drivers 12-1 through 12-N in a number of set-top boxes (STBs) 14-1 through 14-N according to one embodiment of the present invention. In this example, the streaming protocol is the User Datagram Protocol (UDP). As such, the RDMA to streaming protocol drivers 12-1 through 12-N are hereinafter referred to as RDMA to UDP streaming drivers 12-1 through 12-N. However, the present invention is not limited to UDP. The present invention is equally applicable to any other streaming protocol. Also, while RDMA is discussed herein as the preferred embodiment, the present invention is not limited thereto. Other direct memory-to-memory block transfer schemes may be used. Further, as used herein, "RDMA" is not necessarily any particular RDMA protocol but is rather any digital content transfer scheme enabling transfer of digital content from the memory or other digital storage unit of one device to the memory or other digital storage unit of another device via a network with minimal or no Central Processing Unit (CPU) and/or operating system utilization.

The system 10 includes a RDMA enabled content distribution server 16, which is hereinafter referred to as content distribution server 16, communicatively coupled to the STBs 14-1 through 14-N via a network 18. Note that while only one content distribution server 16 is illustrated for clarity and ease of discussion, the system 10 may include any number of one or more content distribution servers 16. The network 18 may be any type of Wide Area Network (WAN), Local Area Network (LAN), or the like, or any combination thereof. In addition, the network 18 may include wired components, wireless components, or both wired and wireless components. In one embodiment, the content distribution server 16 is a headend, or is part of a headend, in a Cable Television (CATV) distribution network supporting Data Over Cable Service Interface Specifications (DOCSIS) 3.0 or similar specification. The network 18 may be, or include, a Hybrid Fiber Coax (HFC) delivery network utilizing Quadrature Amplitude Modulation (QAM) where Switched Digital Video (SDV) circuits may be used to transport Internet Protocol (IP) traffic to the STBs 14-1 through 14-N.

The content distribution server 16 generally hosts media content such as, for example, broadcast television content, Video on Demand (VOD) content, broadcast radio content, advertisements, or the like, or any combination thereof. As discussed below, RDMA may be used to transfer media content from the content distribution server 16 to the STBs 14-1 through 14-N. Depending on the implementation of the network 18, iWARP, RDMA over Ethernet (RoE), InfiniBand (IB), or the like may be used to carry the RDMA traffic. For more information regarding an exemplary embodiment of the content distribution server 16, the interested reader is directed to commonly owned and assigned U.S. patent application Ser. No. 11/831,228, entitled RDMA BASED REAL-TIME VIDEO CLIENT PLAYBACK ARCHITECTURE, which was filed on Jul. 31, 2007 and is hereby incorporated herein by reference in its entirety. The interested reader is also directed to commonly owned and assigned U.S. patent application Ser. No. 11/685,479, entitled LATE-BINDING OF ADVERTISEMENTS USING RDMA CONNECTIVITY, which was filed on Mar. 13, 2007 and is hereby incorporated herein by reference in its entirety.

In one embodiment, the content distribution server 16 publishes a mapping to the STBs 14-1 through 14-N. The mapping generally includes metadata describing each of a number of media content items available from the content distribution server, RDMA address ranges in a high-speed storage device of the content distribution server 16 allocated to the media content items, and source address information for the media content items. The media content items may be broadcast television channels, VOD content items such as movies or television programs, broadcast radio stations, advertisements or advertisement categories, or the like. Note that the content distribution server 16 may rotate data into and out of the allocated address ranges in the high-speed storage device as needed in order to serve the content items. The high-speed storage device may be, for example, one or more Random Access Memory (RAM) disks or the like. The metadata describing the media content items may be, for example, titles of the media content items, genres of the media content items, release dates of the media content items, a textual description of the media content items, or the like, or any combination thereof. As discussed below, the source information is also referred to as pseudo source addresses for the media content items. The pseudo source addresses may be, for example, a combination of IP source addresses and UDP source ports that trigger operation of the RDMA to UDP streaming drivers 12-1 through 12-N and further enable the RDMA to UDP streaming drivers 12-1 through 12-N to emulate a UDP protocol layer.

In addition, the mapping may include information such as, for example, format specification information on encapsulation within RDMA. More specifically, the format specification information may confirm or identify how the media content is packaged within the RDMA address space. For example, the media content may be packaged within the RDMA address space according to the Real-time Transport Protocol (RTP). In addition, the format specification information may identify a video compression scheme used for the media content items. For example, the media content items may be compressed according to the H.264 (MPEG-4/Part 10) or MPEG-2 standard. The mapping may also identify whether the media content items are fully stored within the associated RDMA address ranges or are buffered within the associated RDMA address ranges. For example, if video content from a broadcast television channel is buffered into a corresponding RDMA address range, the content distribution server 16 rotates new content into the RDMA address range. As such, when playback of the broadcast television channel is desired, the RDMA to UDP streaming drivers 12-1 through 12-N perform multiple RDMA transfers to obtain content as the content is rotated into the RDMA address range.

The STB 14-1 includes a network interface 20-1 and a streaming playback function 22-1. The RDMA to UDP streaming driver 12-1 is implemented within the network interface 20-1. In one embodiment, the network interface 20-1, including the RDMA to UDP streaming driver 12-1, is implemented in hardware. However, the present invention is not limited thereto. The RDMA to UDP streaming driver 12-1 may alternatively be implemented in software or a combination of hardware and software. Note that while only one RDMA to UDP streaming driver 12-1, 12-N is illustrated per STB 14-1, 14-N, the present invention is not limited thereto. The RDMA to UDP streaming driver 12-1, 12-N may be replicated to provide multiple streaming feeds. Alternatively, the RDMA to UDP streaming driver 12-1, 12-N may be capable of processing multiple streaming feeds where a separate buffer or segment of a buffer associated with the RDMA to UDP streaming driver 12-1, 12-N may be allocated to each of the streaming feeds.

The streaming playback function 22-1 may be implemented in software, hardware, or a combination thereof. In this example, the streaming playback function 22-1 is a UDP-based playback function, an RTP-based playback function where UDP is utilized to transport the RTP traffic, or the like. As discussed below, with respect to the streaming playback function 22-1, the RDMA to UDP streaming driver 12-1 emulates a UDP protocol stack such that underlying RDMA transfers of desired media content items from the content distribution server 16 are transparent to the streaming playback function 22-1.

Like the STB 14-1, the other STBs 14-2 through 14-N include network interfaces 20-2 through 20-N and streaming playback function 22-2 through 22-N. Again, the RDMA to UDP streaming drivers 12-2 through 12-N are implemented in the network interfaces 20-2 through 20-N.

Figure 2:
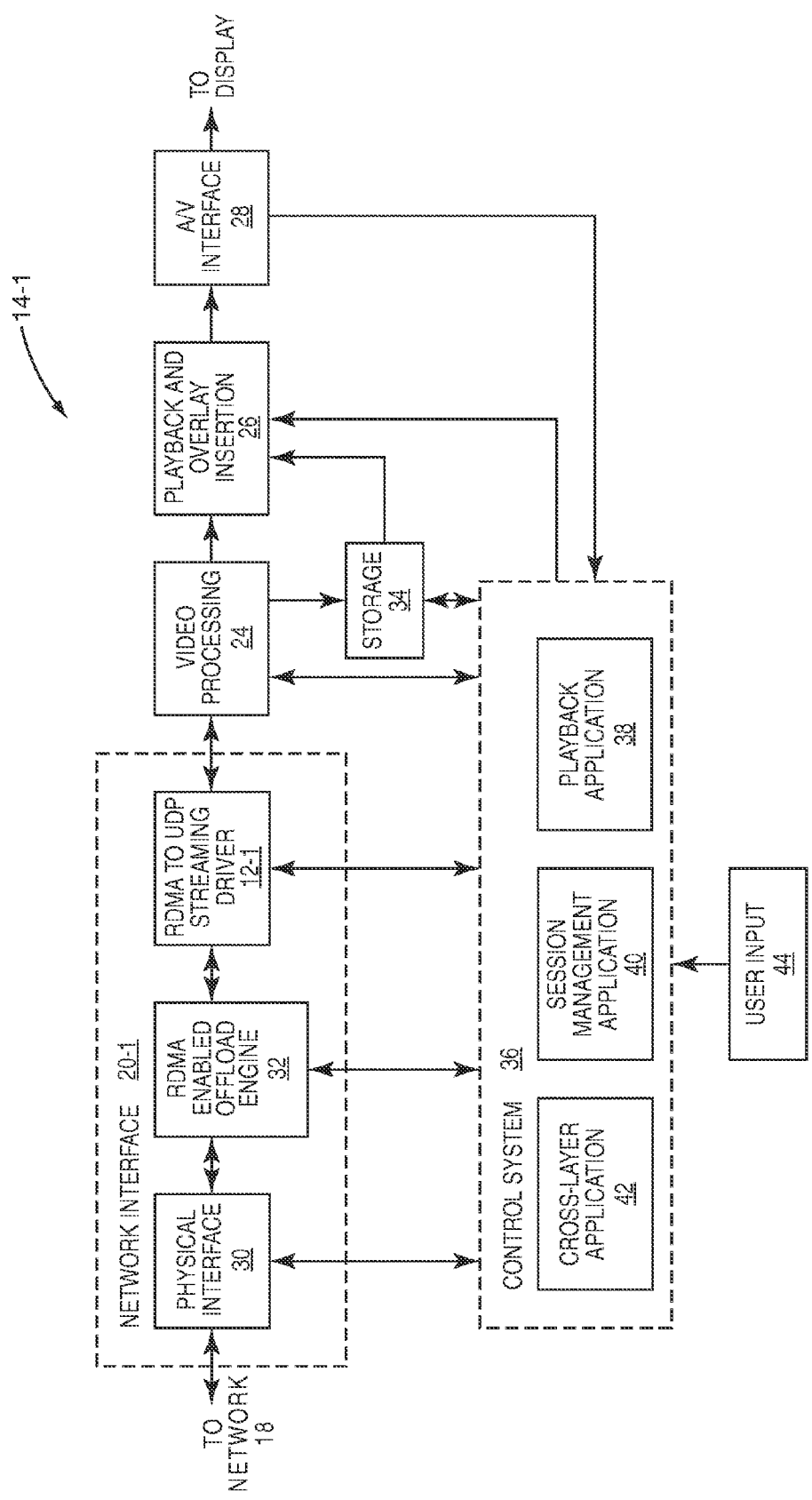
FIG. 2 is a more detailed block diagram of one of the STBs of FIG. 1 according to one embodiment of the present invention.

FIG. 2 is a more detailed block diagram of the STB 14-1 according to one embodiment of the present invention. Note that the following discussion is equally applicable to the other STBs 14-2 through 14-N. The STB 14-1 includes the network interface 20-1, a video processing function 24, an optional playback and overlay insertion function 26, and an audio/video (A/V) interface 28. The network interface 20-1 includes a physical interface 30, a RDMA enabled offload engine 32, and the RDMA to UDP streaming driver 12-1. The physical interface 30 may be, for example, a DOCSIS 3.0 cable network interface. However, the present invention is not limited thereto. Other types of physical interfaces may be used depending on the network 18.

The RDMA enabled offload engine 32 is preferably implemented in hardware and operates to implement Layers 2 through 4 of the protocol stack. The RDMA enabled offload engine 32 is enabled to perform RDMA transfers from the content distribution server 16 to memory associated with the RDMA to UDP streaming driver 12-1 utilizing iWARP, RoE, IB, or the like. In addition, the RDMA enabled offload engine 32 may provide other types of connectivity such as, for example, UDP connectivity, TCP connectivity, or the like. In other words, the RDMA enabled offload engine 32 is not limited to RDMA transfers. For example, television content or VOD content may be streamed to the STB 14-1 utilizing RTP and targeted advertisements for insertion into the television or VOD content may be obtained utilizing RDMA. The RDMA enabled offload engine 32 may therefore support RTP, or at least the transmission control protocol (TCP) or UDP layer used to carry the RTP traffic, as well as RDMA. Note that for content that is already in a streaming protocol format, the RDMA to UDP streaming driver 12 may be bypassed or operate in a pass-through mode.

As discussed below, the RDMA to UDP streaming driver 12-1 operates to issue RDMA transfer requests to the RDMA enabled offload engine 32 for desired media content items. As a result, the media content items are provided directly to memory associated with the RDMA to UDP streaming driver 12-1. The RDMA to UDP streaming driver 12-1 converts the desired media content items from the RDMA format, or protocol, to the UDP format, or protocol, and provides the converted media content items to the video processing function 24 as streaming media content items. The RDMA to UDP streaming driver 12-1 emulates a UDP layer with respect to the video processing function 24 such that the RDMA transfers that are utilized to transfer the desired media content items to the STB 14-1 are transparent to the video processing function 24. The video processing function 24 may perform functions such as decryption and decoding.

In this embodiment, after processing by the video processing function 24, the media content items are provided to the playback and overlay insertion function 26 and, optionally, storage 34. The storage 34 may be, for example, a hard-disk drive and may be used to provide Digital Video Recorder (DVR) functionality or the like. The playback and overlay insertion function 26 is controlled by a control system 36 to select either the output of the video processing function 24 or the storage 34 and, optionally, insert a desired overlay onto the selected media content. The output of the playback and overlay insertion function 26 is then provided to the A/V interface 28 for output to an associated display and/or sound system.

The control system 36 includes a playback application 38, a session management application 40, and a cross-layer application 42 each of which is preferably implemented in software but may alternatively be implemented in hardware or a combination of hardware and software. Together with the video processing function 24 and the playback and overlay insertion function 26, the playback application 38 forms the streaming playback function 22-1 of FIG. 1. The playback application 38 generally operates to enable selection of media content for playback and control playback of the selected media content based on user input 44 from one or more associated viewers. The user input 44 may be, for example, the selection of a desired media content item from a listing or menu of media content items available from the content distribution server 16 or input related to the control of playback such as pause, rewind, fast-forward, or the like.

The session management application 40 operates to obtain the mappings from the content distribution server 16 for the available media content items. As discussed above, the mappings include metadata describing the media content items, the RDMA address ranges for the media content items, and pseudo source addresses for the media content items. In addition, the mappings may include format specific information identifying how the content is packaged within the RDMA address space and the protocol used for video compression. When a media content item is selected for playback, the playback application 38 sends a request including a pseudo source address for the media content item to the session management application 40. In response, if the pseudo source address is one of the pseudo source addresses from the mappings from the content distribution server 16, the session management application 40 interacts with the cross-layer application 42 to trigger the RDMA to UDP streaming driver 12-1. In addition, the session management application 40 provisions the video processing function 24 for the playback session by providing the pseudo source address and a pseudo destination address or, alternatively, the UDP source port and a UDP destination port to the video processing function 24 for the playback session. As discussed below, the same pseudo source and destination addresses or, alternatively, the same UDP source and destination ports are thereafter used by the RDMA to UDP streaming driver 12-1 in order to spoof the video processing function 24 such that the underlying RDMA transfers are transparent to the video processing function 24.

The cross-layer application 42 provides parameters to the RDMA to UDP streaming driver 12-1 and enables monitoring of the RDMA to UDP streaming driver 12-1 by, for example, the session management application 40 and/or the playback application 38. More specifically, in one embodiment, the cross-layer application 42 provides appropriate Application Programming Interfaces (APIs) for provisioning and monitoring the RDMA to UDP streaming driver 12-1. The APIs may include one or more APIs for providing parameters to the RDMA to UDP streaming driver 12-1 such as an IP source address, a UDP source port, an IP destination address, a UDP destination port, a RDMA starting address, a RDMA ending address, and a content storage type such as complete or buffered. The APIs may also include one or more APIs for monitoring a status of a buffer or memory associated with the RDMA to UDP streaming driver 12-1 and/or RDMA transfer status.

Figure 3:
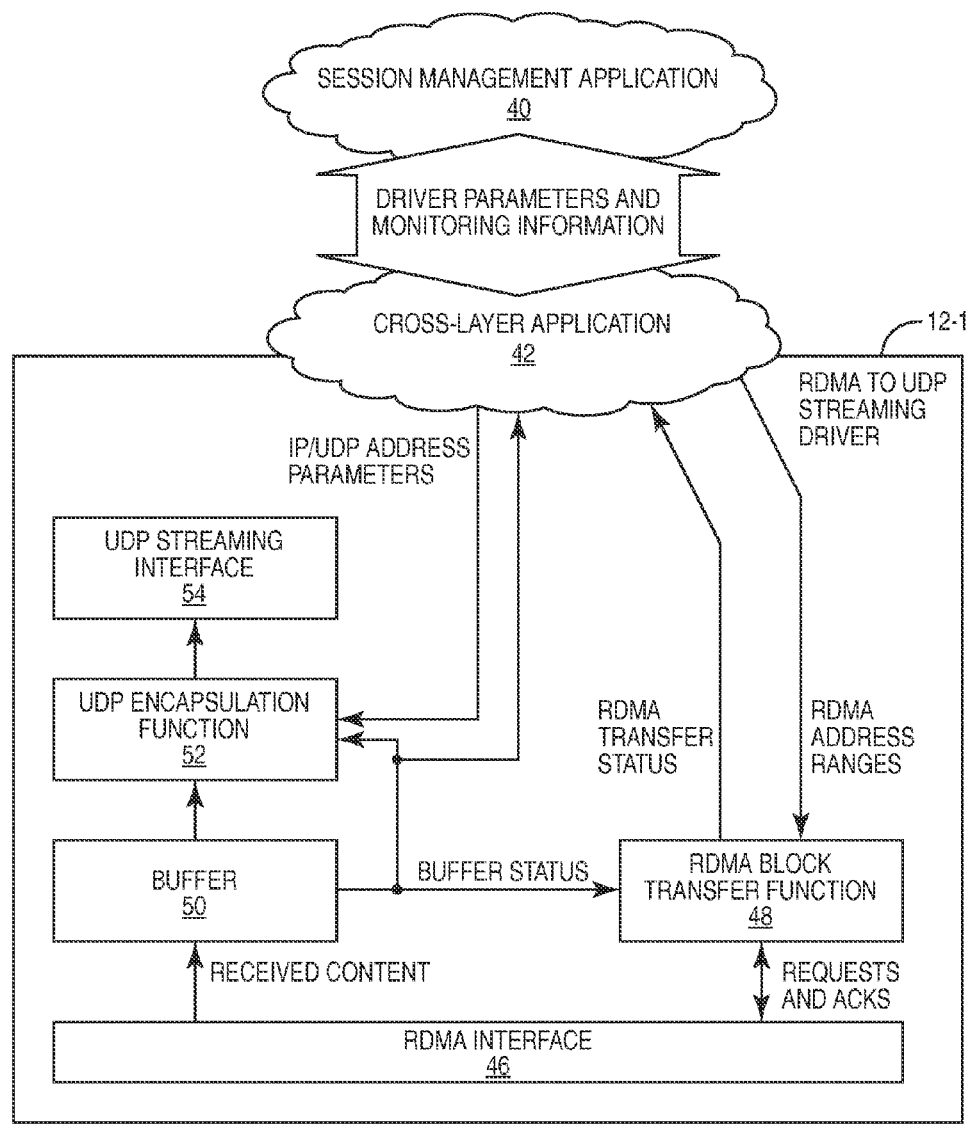
FIG. 3 is a more detailed block diagram of the RDMA to streaming protocol driver according to one embodiment of the present invention.

FIG. 3 is a more detailed illustration of the RDMA to UDP streaming driver 12-1 according to one embodiment of the present invention. In general, the RDMA to UDP streaming driver 12-1 includes a RDMA interface 46, a RDMA block transfer function 48, a buffer 50, a UDP encapsulation function 52, and a UDP streaming interface 54. The RDMA interface 46 connects the RDMA block transfer function 48 and the buffer 50 to the RDMA enabled offload engine 32 (FIG. 2). The RDMA block transfer function 48 issues RDMA transfer requests to the RDMA enabled offload engine 32 via the RDMA interface 46. More specifically, when initiating a RDMA transfer of a desired media content item, a RDMA address range for the desired media content item is provided to the RDMA block transfer function 48 from the cross-layer application 42. Assuming that the RDMA address range is larger than the size of the buffer 50 and/or an amount of available space in the buffer 50, the RDMA block transfer function 48 issues multiple RDMA transfer requests for sub-blocks of the RDMA address range until the entire RDMA address range has been transferred. Note that depending on the RDMA transfer scheme, the RDMA block transfer function 48 may send and receive acknowledgements via the RDMA interface 46 when performing RDMA transfers.

Data received in response to RDMA transfer requests issued by the RDMA block transfer function 48 is temporarily stored or buffered in the buffer 50. As discussed below, a status of the buffer 50 is provided to the RDMA block transfer function 48 and used to determine an optimal block transfer size when issuing RDMA transfer requests. The buffer status may also be provided to the UDP encapsulation function 52 in order to notify the UDP encapsulation function 52 when data is available in the buffer 50. In addition, the buffer status may be provided to the cross-layer application 42 for monitoring purposes. The buffer status may be, for example, a percentage of the buffer 50 that is used; a percentage of the buffer 50 that is unused; a number of bytes of data stored in the buffer 50; a number of additional bytes of data that can be stored by the buffer 50 before the buffer 50 is full; one of a number of predefined threshold values such as full, almost full, half-full, almost empty, and empty; or the like.

As data becomes available in the buffer 50, the UDP encapsulation function 52 converts the data from the RDMA format to the UDP format. More specifically, when triggering the RDMA to UDP streaming driver 12-1, the cross-layer application 42 provides UDP source and destination ports and, optionally, IP source and destination addresses to the UDP encapsulation function 52. The UDP source port and the IP source address are those from the pseudo address for the desired media content item. The UDP encapsulation function 52 obtains the data from the buffer 50, strips the RDMA encapsulation, and formats the data into UDP packets. Formatting the data into UDP packets includes encapsulating the data with the UDP source port, the UDP destination port, packet length, and check sum. Note that the UDP source and destination ports are the same as those provided to the video processing function 24 (FIG. 2) when provisioning the video processing function 24 for the playback session and are therefore expected by the video processing function 24.

In addition, IP source and destination addresses or IP encapsulation may also be expected by the video processing function 24 or otherwise desired. If so, the IP source and destination addresses provided by the cross-layer application 42 and expected by the video processing function 24 may be passed separately to the UDP streaming interface 54. The UDP streaming interface 54 may then perform IP encapsulation if desired or provide the IP source and destination addresses to the video processing function 24 separately. The UDP streaming interface 54 then streams the UDP packets to the video processing function 24.

Figure 4:
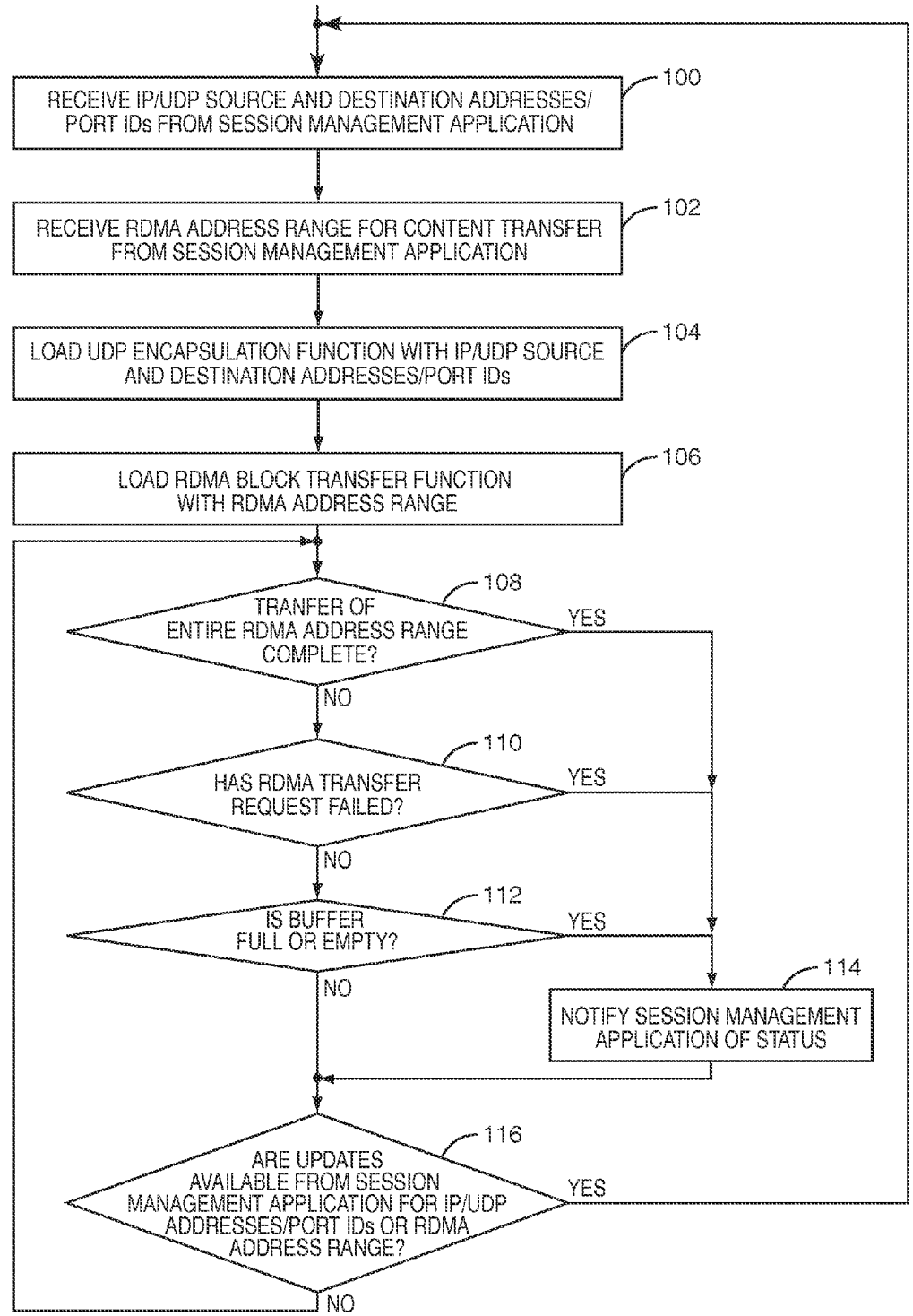
FIG. 4 is a flow chart illustrating the operation of the cross-layer application of FIG. 3 according to one embodiment of the present invention.

FIG. 4 is a flow chart illustrating the operation of the cross-layer application 42 according to one embodiment of the present invention. First, the cross-layer application 42 receives UDP source and destination ports and, optionally, IP source and destination addresses for a desired media content item from the session management application 40 (step 100). Alternatively, the cross-layer application 42 may receive the UDP source and destination ports and, optionally, the IP source and destination addresses from the playback application 38. The cross-layer application 42 also receives or otherwise obtains the RDMA address range for the desired media content item from the session management application 40 (step 102). The cross-layer application 42 then loads the UDP encapsulation function 52 with the UDP source and destination ports and, optionally, the IP source and destination addresses for the desired media content item (step 104). In addition, the cross-layer application 42 loads the RDMA block transfer function 48 with the RDMA address range for the desired media content item (step 106).

More specifically, when the desired media content item is selected for playback, the playback application 38, or alternatively the session management application 40, identifies a pseudo source address for the desired media content item. If the pseudo source address is one of the pseudo source addresses in the mappings provided by the content distribution server 16, the session management application 40 provides the UDP source port and a UDP destination port to the cross-layer application 42. Optionally, the session management application 40 also provides the IP source address and a destination address to the cross-layer application 42. The UDP source port and the IP source address are those from the pseudo source address for the desired media content item and are expected by the video processing function 24. The UDP destination port and the IP destination address are the same as those provided to the video processing function 24 during provisioning for the playback session and are therefore expected by the video processing function 24. In addition, the RDMA address range for the desired media content item is obtained from the mapping based on the pseudo source address for the desired media content item and provided to the cross-layer application 42. The cross-layer application 42 then loads the UDP encapsulation function 52 with the UDP source and destination ports and, optionally, the IP source and destination addresses and loads the RDMA block transfer function 48 with the RDMA address range in order to trigger operation of the RDMA to UDP streaming driver 12-1.

After loading the UDP encapsulation function 52 and the RDMA block transfer function 48, the cross-layer application 42 begins monitoring the RDMA transfer. More specifically, the cross-layer application 42 determines whether the RDMA transfer for the entire RDMA address range is complete (step 108). If the RDMA transfer for the entire RDMA address range is complete, the process proceeds to step 114. Otherwise, the cross-layer application 42 determines whether a RDMA transfer request issued by the RDMA block transfer function 48 has failed (step 110). If so, the process proceeds to step 114. If not, the cross-layer application 42 determines whether the buffer 50 is full or empty (step 112). If so, the process proceeds to step 114. As such, if the transfer of the entire RDMA address range is complete, a RDMA transfer request has failed, or the buffer 50 is full or empty, the cross-layer application 42 notifies the session management application 40 of the status of the RDMA transfer (step 114). The session management application 40 may then take action based upon the status if desired.

At this point, the cross-layer application 42 then determines whether there are updates available from the session management application 40 for the UDP source and destination ports, the IP source and destination addresses, or the RDMA address range (step 116). If so, the process returns to step 100. If not, the process returns to step 108.

Note that if the desired media content item is, for example, a broadcast television channel, the content distribution server 16 may continually rotate or buffer content into the corresponding RDMA address range in the high-speed storage at the content distribution server 16. As such, the session management application 40, or alternatively the cross-layer application 42, may reload the UDP encapsulation function 52 and the RDMA block transfer function 48 with the information for the desired media content item upon being notified that the RDMA transfer is complete in order to request new content from the content distribution server 16 as the new content is rotated or buffered into the RDMA address range for the desired media content item.

Figure 5:
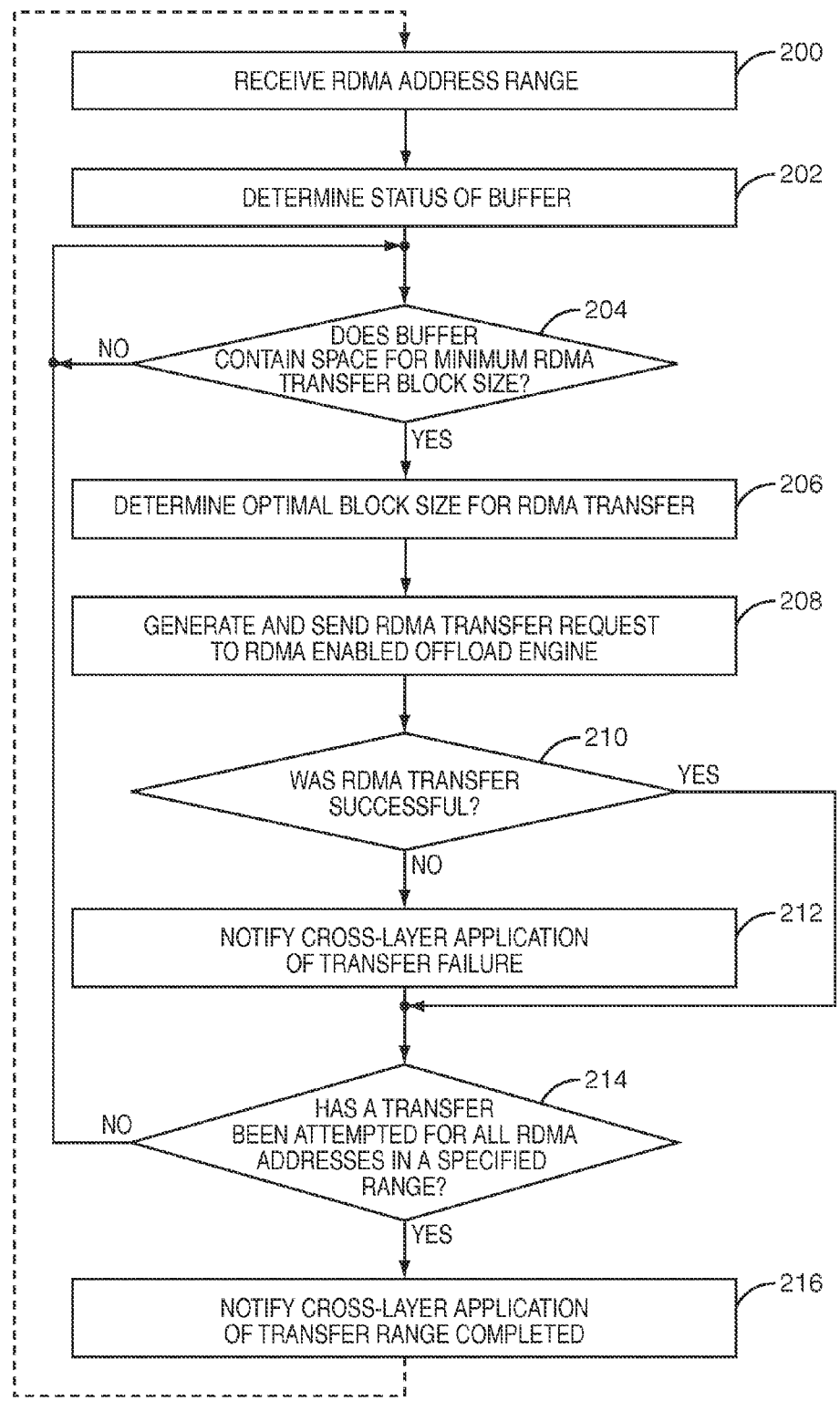
FIG. 5 is a flow chart illustrating the operation of the RDMA block transfer function of the RDMA to streaming protocol driver of FIG. 3 according to one embodiment of the present invention.

FIG. 5 is a flow chart illustrating the operation of the RDMA block transfer function 48 of the RDMA to UDP streaming driver 12-1. First, the RDMA block transfer function 48 receives the RDMA address range for the desired media content item from the cross-layer application 42 (step 200). The RDMA block transfer function 48 then determines the status of the buffer 50 (step 202). As discussed above, the status of the buffer 50 is indicative of an amount of available storage space in the buffer 50. Based on the status of the buffer 50, the RDMA block transfer function 48 determines whether the buffer 50 has enough available storage space for a minimum RDMA transfer block size (step 204). If not, the RDMA block transfer function 48 continues to monitor the status of the buffer 50 until the available storage space in the buffer 50 is greater than or equal to the minimum RDMA transfer block size.

The RDMA block transfer function 48 then determines an optimal block size for a RDMA transfer based on the amount of available storage space in the buffer 50 (step 206). Typically, the optimal block size is less than the size of the RDMA address range. The RDMA block transfer function 48 generates and sends a RDMA transfer request for a block of the RDMA address range to the RDMA enabled offload engine 32 (FIG. 2) (step 208). More specifically, for the first iteration, the RDMA block transfer function 48 generates and sends a RDMA transfer request for a first block of the RDMA address range having a starting address equal to the starting address of the RDMA address range and an ending address determined based on the optimal block size for the RDMA transfer. As discussed below, the process is repeated in order to generate and send RDMA transfer requests for additional blocks of the RDMA address range until the entire RDMA address range has been transferred or the transfer has failed.

After generating and sending the RDMA transfer request for the block of the RDMA address range, the RDMA block transfer function 48 determines whether the RDMA transfer for the requested block was successful (step 210). Note that retrys on request failures are assumed to have been performed in the RDMA enabled offload engine 32. A retry is, for example, automatically re-issuing an RDMA request when unsuccessful. However, as an alternative, the RDMA block transfer function 48 may retry an unsuccessful transfer one or more times before finally determining that the transfer was unsuccessful. If so, the process proceeds to step 214. If not, the RDMA block transfer function 48 notifies the cross-layer application 42 of the transfer failure (step 212). In response, the cross-layer application 42 may notify the session management application 40, and the session management application 40 may take appropriate action if desired. For example, the session management application 40 may terminate the transfer, restart the transfer, or the like.

The RDMA block transfer function 48 then determines whether a RDMA transfer has been attempted to all RDMA addresses in the RDMA address range (step 214). If not, the process returns to step 204 and is repeated in order to request a next block of the RDMA address range. Note that the starting address for the next RDMA request is set to the ending address of the previous RDMA request plus one address. Once the entire RDMA address range has been requested, the RDMA block transfer function 48 notifies the cross-layer application 42 that the RDMA transfer of the RDMA address range is complete (step 216).

Figure 6:
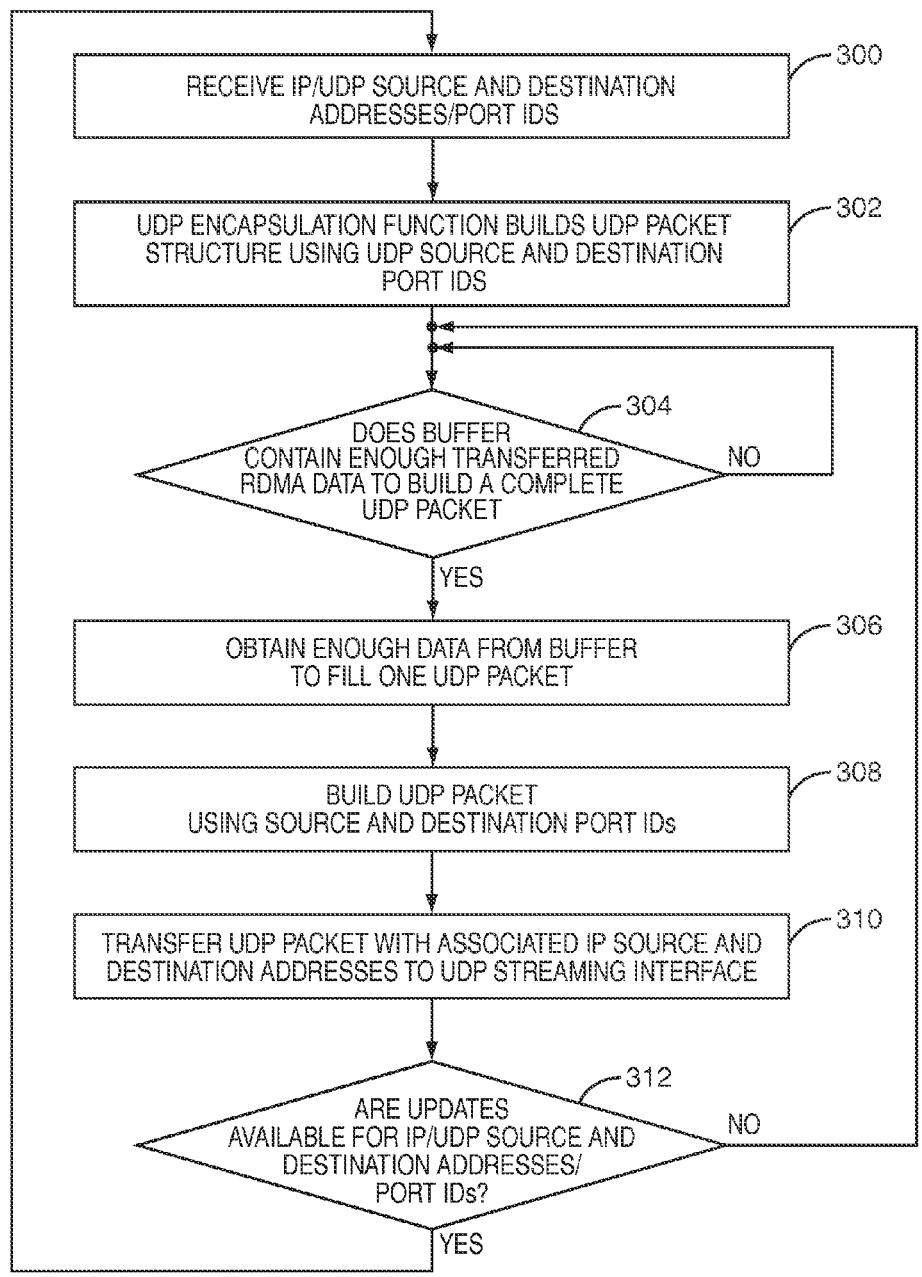
FIG. 6 is a flow chart illustrating the operation of the encapsulation function of the RDMA to streaming protocol driver of FIG. 3 according to one embodiment of the present invention.

FIG. 6 is a flow chart illustrating the operation of the UDP encapsulation function 52 of FIG. 3 according to one embodiment of the present invention. First, the UDP encapsulation function 52 receives the UDP source and destination ports and, optionally, the IP source and destination addresses from the cross-layer application 42 (step 300). The UDP encapsulation function 52 then builds a UDP packet structure using the UDP source and destination ports or, alternatively, an IP/UDP packet structure using the UDP source and destination ports and the IP source and destination addresses (step 302). If RTP is used as a high protocol layer, then the packet length may be optimized to a predetermined RTP packet structure. However, the packet length may be adjusted based on RDMA block transfer sizes and/or the size of the buffer 50. As an alternative embodiment, the UDP packet length may be determined based on the current amount of data in the buffer 50 awaiting encapsulation.

Next, the UDP encapsulation function 52 determines whether the buffer 50 contains enough transferred RDMA data to build a complete UDP packet (step 304). If not, the UDP encapsulation function 52 waits until the buffer 50 contains enough transferred RDMA data to build a complete UDP packet. If the buffer 50 contains enough transferred RDMA data to build a complete UDP packet, the UDP encapsulation function 52 obtains enough data from the buffer 50 to fill one UDP packet (step 306). The UDP encapsulation function 52 then builds or generates a UDP packet for the data obtained from the buffer 50 using the UDP source and destination ports for the desired media content item (step 308). A checksum may also be calculated and added to the UDP packet. The UDP encapsulation function 52 then transfers the UDP packets and, optionally, the IP source and destination addresses to the UDP streaming interface 54 (step 310). Optionally, the UDP streaming interface 54 may encapsulate the UDP packet within an IP packet using the IP source and destination addresses for the media content item.

After transferring the UDP packet to the UDP streaming interface 54, the UDP encapsulation function 52 determines whether updates for the UDP source and destination ports or the IP source and destination addresses are available from the cross-layer application 42 (step 312). If not, the process returns to step 304. If so, the process returns to step 300.

Figure 7:
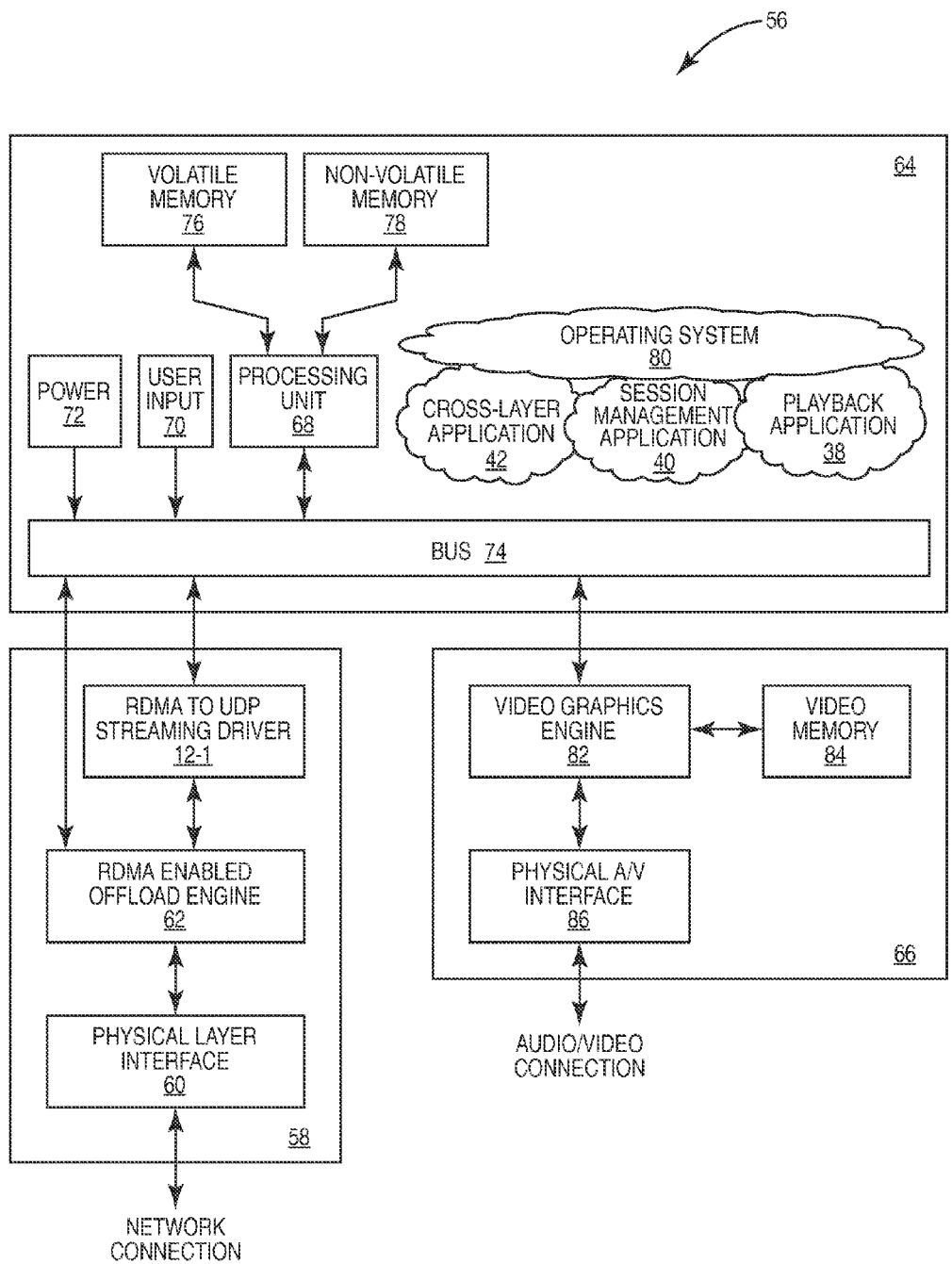
FIG. 7 illustrates a personal computing system wherein the RDMA to streaming protocol driver is implemented within a network interface of the personal computing system according to a second embodiment of the present invention.

While FIG. 1 illustrates the system 10 wherein the RDMA to UDP streaming drivers 12-1 through 12-N are implemented in the network interfaces 20-1 through 20-N of the STBs 14-1 through 14-N, the present invention is not limited thereto. The RDMA to UDP streaming drivers 12-1 through 12-N may be implemented in any type of device having playback capabilities. For example, FIG. 7 illustrates a personal computing system 56 where the RDMA to UDP streaming driver 12-1 is implemented in a network interface 58 of the personal computing system 56. The personal computing system 56 may be, for example, a personal computer, a mobile device such as a mobile phone having media content playback functionality, a gaming console having media content playback functionality, or the like.

The network interface 58 may be a Network Interface Card (NIC) wherein the RDMA to UDP streaming driver 12-1 is implemented in hardware such as, for example, a Field Programmable Gate Array (FPGA), Application Specific Integrated Circuit (ASIC), or the like. Note that the buffer 50 may be implemented as one or more memory devices within or external to the FPGA, ASIC, or the like. In addition to the RDMA to UDP streaming driver 12-1, the network interface 58 also includes a physical layer interface 60 and a RDMA enabled offload engine 62 connected as shown. The RDMA enabled offload engine 62 is not limited to performing RDMA transfers. The RDMA enabled offload engine 62 may additionally be enabled to perform other types of network communication such as, for example, TCP/IP, UDP, RTP, or the like.

The personal computing system 56 also includes a control system 64 and an A/V interface 66 interconnected as shown. The control system 64 includes a processing unit 68, one or more user input devices 70, and a power supply 72 connected via a bus 74. The processing unit 68 is connected to volatile memory 76 such as, for example, RAM. In addition, the processing unit 68 may be connected to non-volatile memory 78 such as, for example, a hard-disk drive. As illustrated, an operating system 80, which is implemented in software, is executed by the processing unit 68. In this embodiment, the playback application 38, the session management application 40, and the cross-layer application 42 are implemented in software and execute on the operating system 80. Note that in this example, video processing functions such as decryption and decoding may be performed by the playback application 38. Alternatively, the personal computing system 56 or the control system 64 may include a separate video processing function that performs video processing functions such as, for example, decryption and decoding.

In this example, the A/V interface 66 includes a video graphics engine 82, video memory 84, and a physical A/V interface 86 interconnected as shown. The operation of the video graphics engine 82 and the video memory 84 will be apparent to one of ordinary skill in the art upon reading this disclosure. The physical A/V interface 86 may be any type of protected or unprotected A/V interface such as, for example, a Digital Video Interface (DVI), a High-Definition Multimedia Interface (HDMI), or the like.

Figure 8:
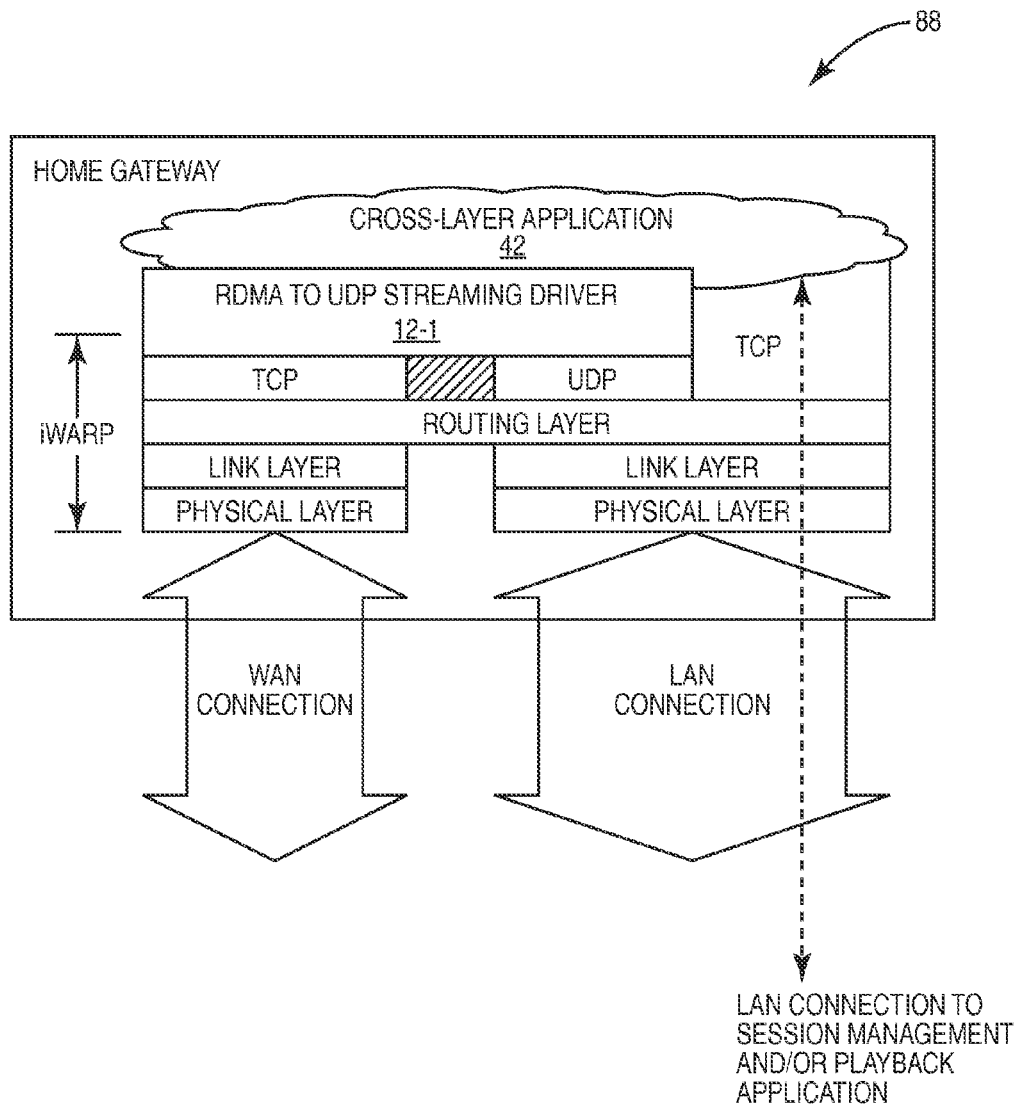
FIG. 8 illustrates a home gateway router incorporating the RDMA to streaming protocol driver according to a third embodiment of the present invention.

In the embodiments discussed above, the RDMA to UDP streaming driver 12-1 is implemented in a user device or system such as a STB or personal computing system; however, the present invention is not limited thereto. As illustrated in FIG. 8, the RDMA to UDP streaming driver 12-1 may alternatively be implemented in a home gateway router 88. RDMA transfers are performed as discussed above. However, UDP packets are passed back down the network protocol stack for routing, such as IP routing, over the home network to one or more client devices implementing standard UDP-based or RTP-based playback functions.

Those skilled in the art will recognize improvements and modifications to the preferred embodiments of the present invention. All such improvements and modifications are considered within the scope of the concepts disclosed herein and the claims that follow.

What is claimed is:

1. A method performed in a network interface of a playback device for providing a data stream to a streaming media content playback function of the playback device, comprising:
   accessing, at the playback device, a mapping stored at the playback device that maps a desired content item to a source address expected by the streaming media content playback function of the playback device and to a range of addresses in a storage device of a remote content distribution server allocated to the desired content item;
   performing, at the playback device, using the range of addresses, a direct memory-to-memory transfer of the desired media content item from the remote content distribution server to a local memory of the playback device;
   encapsulating, at the playback device, the desired media content item from the local memory into a plurality of packets according to a streaming protocol, wherein encapsulating the desired media content item includes inserting into each of the plurality of packets the source address and a destination address expected by the streaming media content playback function; and
   streaming the plurality of packets to the streaming media content playback function of the playback device.

2. The method of claim 1 wherein performing the direct memory-to-memory transfer comprises performing a Remote Direct Memory Access (RDMA) transfer of the desired media content item from a storage device of the remote content distribution server to the local memory of the playback device.

3. The method of claim 1 wherein the direct memory-to-memory transfer is transparent to the streaming media content playback function.

4. The method of claim 1 wherein encapsulating, at the playback device, the desired media content item from the local memory into the plurality of packets according to the streaming protocol further comprises converting the desired media content item from a first format utilized for the direct memory-to-memory transfer to a streaming protocol format.

5. The method of claim 4 wherein the first format comprises a TCP format, and the streaming protocol format comprises a UDP format.

6. The method of claim 1 wherein the streaming protocol is a User Datagram Protocol (UDP).

7. The method of claim 6 wherein the streaming media content playback function is a UDP-based media content playback function.

8. The method of claim 6 wherein the source address comprises a source port and the destination address comprises a destination port.

9. The method of claim 1 wherein performing the direct memory-to-memory transfer comprises:
   determining an optimal transfer block size based on an amount of available storage space in the local memory;
   issuing a direct memory-to-memory request for a block of the range of addresses in the storage device of the remote content distribution server having the optimal transfer block size; and
   determining an optimal transfer block size and issuing a direct memory-to-memory request for at least one additional block of the range of the addresses in the storage device of the remote content distribution server.

10. A network interface for a playback device comprising:
    a) a physical interface coupling the network interface to a network;
    b) an offload engine connected to the physical interface and enabled to perform direct memory-to-memory transfers via the network; and
    c) a direct memory-to-memory to streaming protocol driver connected to the offload engine and adapted to:
       access a mapping stored at the playback device that maps a desired content item to a source address expected by the streaming media content playback function of the playback device and to a range of addresses in a storage device of a remote content distribution server allocated to the desired content item;
       perform, via the offload engine, using the range of addresses, a direct memory-to-memory transfer of the desired media content item from the remote content distribution server to a local memory over the network;
       encapsulate the desired media content item from the local memory into a plurality of packets according to a streaming protocol, wherein encapsulating the desired media content item includes inserting into each of the plurality of packets the source address and a destination address expected by a streaming media content playback function; and
       stream the plurality of packets to the streaming media content playback function of the playback device.

11. The network interface of claim 10 wherein the direct memory-to-memory transfer is a Remote Direct Memory Access (RDMA) transfer of the desired media content item from a storage device of the remote content distribution server to the local memory via the network.

12. The network interface of claim 10 wherein the direct memory-to-memory transfer is transparent to the streaming media content playback function.

13. The network interface of claim 10 wherein in order to encapsulate the desired media content item from the local memory into the plurality of packets according to the streaming protocol, the direct memory-to-memory to streaming protocol driver is further adapted to convert the desired media content item from a first format utilized for the direct memory-to-memory transfer to a streaming protocol format.

14. The network interface of claim 10 wherein the streaming protocol is a User Datagram Protocol (UDP).

15. The network interface of claim 14 wherein the streaming media content playback function is a UDP-based media content playback function.

16. The network interface of claim 10 wherein in order to perform the direct memory-to-memory transfer, the direct memory-to-memory to streaming protocol driver is further adapted to:
- determine an optimal transfer block size based on an amount of available storage space in the local memory;
- issue a direct memory-to-memory request to the offload engine for a block of the range of addresses in the storage device of the remote content distribution server having the optimal transfer block size; and
- determine an optimal transfer block size and issue a direct memory-to-memory request for at least one additional block of the range of the addresses in the storage device of the remote content distribution server.

17. In a network interface card comprising a multi-layered protocol stack which provides a User Datagram Protocol (UDP) stream of data to a downstream video processing function of a playback device, a method comprising:
- accessing a mapping stored at the playback device that maps a desired content item to a source address expected by the downstream video processing function and to a range of addresses in a storage device of a remote content distribution server allocated to the desired content item;
- initiating, at a first layer of the protocol stack, using the range of addresses a direct memory-to-memory transfer of the desired media content item from the remote content distribution server to a local memory of the playback device;
- formatting, in a second layer of the protocol stack, the desired media content item into UDP packets, wherein the formatting includes inserting into each of the UDP packets the source address and a destination address expected by the downstream video processing function; and
- providing the UDP packets in a stream to the downstream video processing function.

18. The method of claim 17 further comprising receiving metadata from the remote content distribution server identifying the desired media content item and the source address.

* * * * *